(12) United States Patent
Lappin

(10) Patent No.: US 7,055,593 B2
(45) Date of Patent: Jun. 6, 2006

(54) WELL STUFFING BOX PACKING

(75) Inventor: Scott C. Lappin, Douglas, WY (US)

(73) Assignee: Lappintech, LLC, Douglas, WY (US)

( * ) Notice: Subject to any disclaimer, the term of this patent is extended or adjusted under 35 U.S.C. 154(b) by 0 days.

(21) Appl. No.: 10/713,682

(22) Filed: Nov. 14, 2003

(65) Prior Publication Data
US 2005/0103505 A1 May 19, 2005

(51) Int. Cl.
E21B 19/00 (2006.01)

(52) U.S. Cl. ..................... 166/84.1; 277/511

(58) Field of Classification Search .............. 166/81.1, 166/84.1, 84.5; 277/308, 511, 536, 537
See application file for complete search history.

(56) References Cited

U.S. PATENT DOCUMENTS

| | | | |
|---|---|---|---|
| 712,512 A | 11/1902 | Elliott | |
| 1,044,787 A | 11/1912 | Klingloff | |
| 2,278,347 A | 3/1942 | Cope, Jr. | |
| 2,765,185 A | 10/1956 | Mott | |
| 2,789,846 A | 4/1957 | Moseley | |
| 2,833,572 A | 5/1958 | Moseley | |
| 2,994,549 A | 8/1961 | Tschappat | |
| 3,002,776 A | 10/1961 | Tschappat | |
| 3,013,830 A | 12/1961 | Milligan | |
| 3,013,831 A | 12/1961 | Tschappat | |
| 3,050,312 A | 8/1962 | Tschappat | |
| 3,084,946 A | 4/1963 | Sharp | |
| 3,194,571 A | 7/1965 | Peickii et al. | |
| 3,351,350 A | 11/1967 | Shepler | |
| 3,434,727 A | 3/1969 | Kollenberger | |
| 3,955,673 A | 5/1976 | Fosness | |
| 4,192,517 A | 3/1980 | Torres | |
| 4,239,245 A | 12/1980 | Giglio et al. | |
| 4,560,176 A | 12/1985 | Hoff | |
| 5,622,371 A | 4/1997 | Angelo et al. | |
| 5,687,974 A | 11/1997 | Wilkinson et al. | |
| 5,806,858 A | 9/1998 | Harrelson, III | |
| 5,845,909 A | 12/1998 | Angelo et al. | |
| 6,385,956 B1 | 5/2002 | Ottinger et al. | |
| 6,390,666 B1 | 5/2002 | Schafer et al. | |
| 2003/0214100 A1* | 11/2003 | Pippert | 277/510 |
| 2004/0035574 A1* | 2/2004 | Pippert | 166/90.1 |
| 2005/0011642 A1* | 1/2005 | Hult | 166/84.2 |

OTHER PUBLICATIONS

Lubri-Pack, Advertisement Sheet, date unknown, 1 page.

* cited by examiner

Primary Examiner—William Neuder

(57) ABSTRACT

Disclosed herein are apparatus and methods for sealing a well stuffing box.

25 Claims, 11 Drawing Sheets

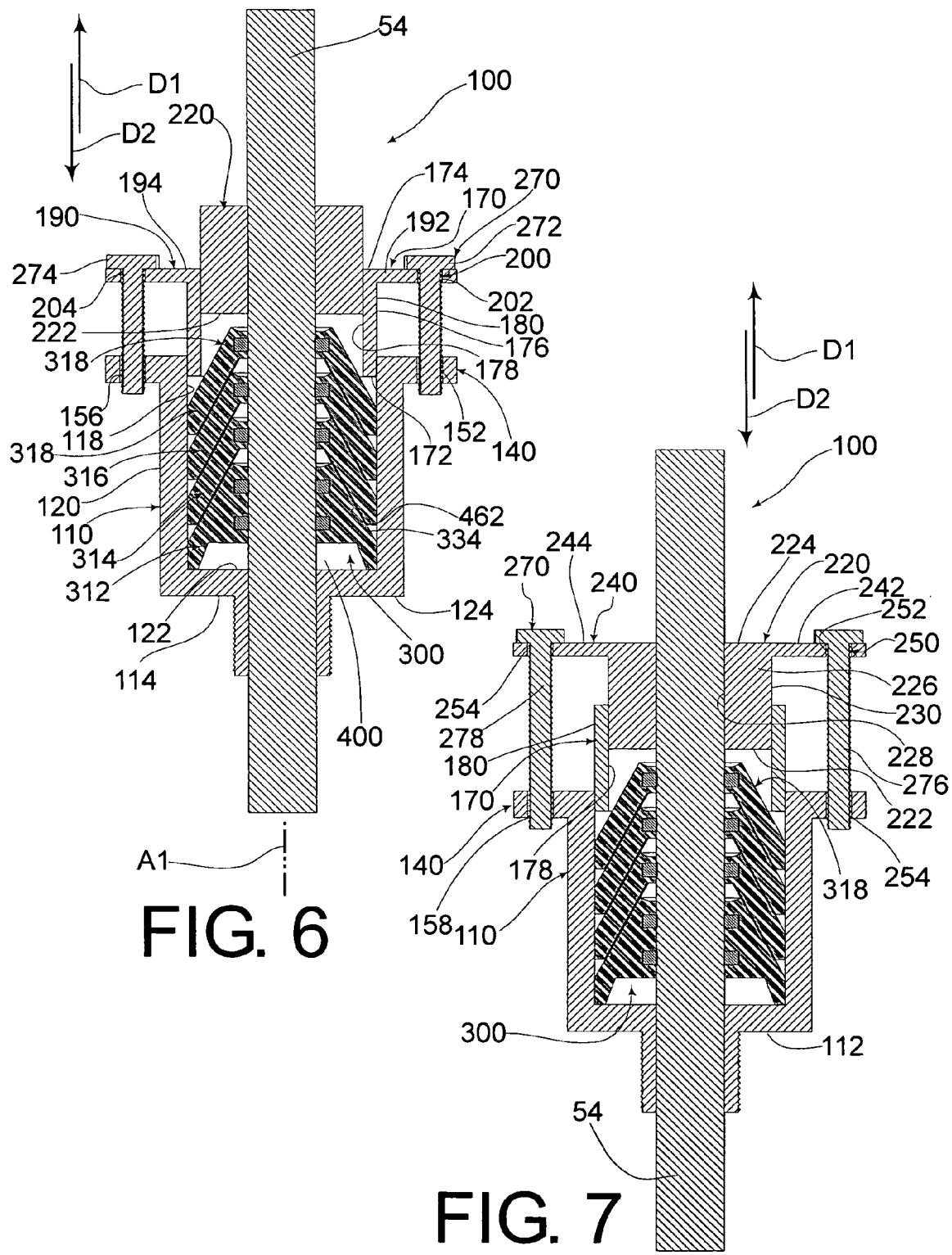

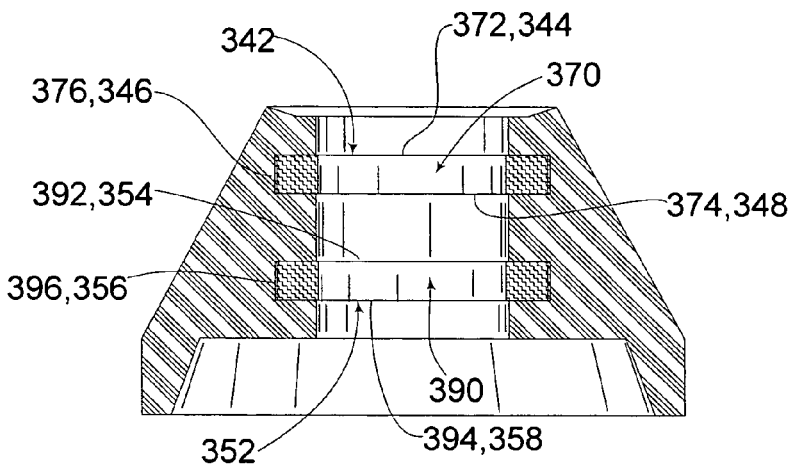
FIG. 15
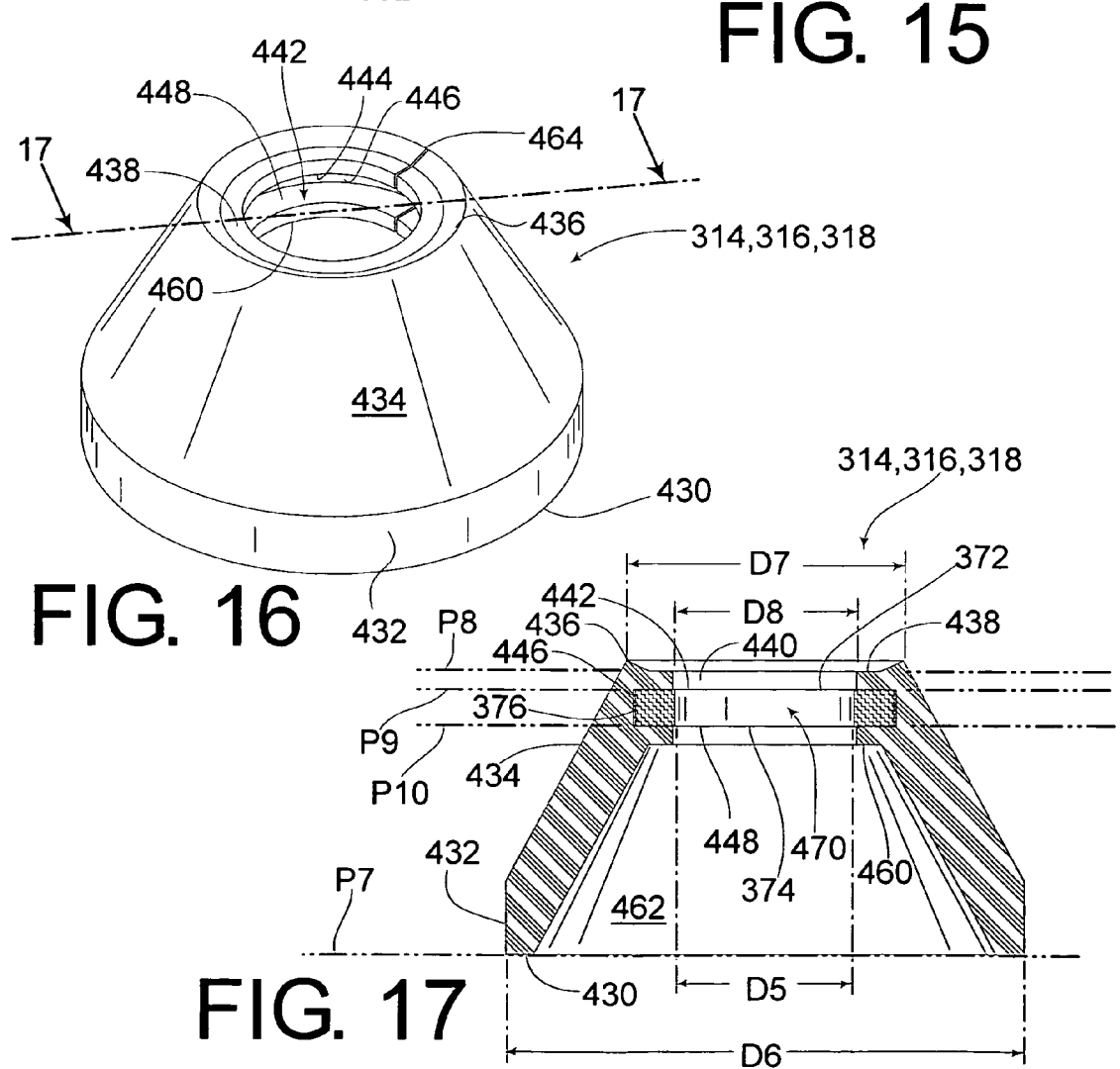
FIG. 16
FIG. 17

WELL STUFFING BOX PACKING

BACKGROUND

Liquids (e.g. oil) contained within the earth may be removed by an well. One type of well moves a polish rod to operate a subterranean pump. This polish rod is powered by an external motor; therefore, the well requires a device for confining the liquid to a distribution path while allowing proper operation of the polish rod. This device is commonly referred to as a stuffing box.

The stuffing box confines the liquid while allowing the polish rod to transfer energy to the pump. This stuffing box is subjected to severe conditions, such as heat, abrasion, misalignment and other performance-degrading conditions.

SUMMARY

In one exemplary embodiment provided herein, a packing rubber for an well stuffing box defining a first axis may include: a base portion; a top portion oppositely disposed from the base portion; a hole along the first axis, the hole extending from the base portion to the top portion; an annular groove formed in the hole; and a fiber ring disposed within the annular groove.

BRIEF DESCRIPTION OF THE DRAWING

Illustrative embodiments are shown in Figures of the Drawing in which:

FIG. 6 shows a cross-sectional side view of the exemplary stuffing box and a packing assembly taken across plane 6—6 of FIG. 5.

FIG. 7 shows a cross-sectional side view of the exemplary stuffing box and a packing assembly taken across plane 7—7 of FIG. 5.

FIG. 15 shows a cross-sectional view of the exemplary first cone of FIG. 10 provided with an exemplary fiber ring, the cross-sectional view is taken across plane 15—15 of FIG. 10 (with the addition of the exemplary fiber ring).

FIG. 16 shows a perspective view of an exemplary second cone.

FIG. 17 shows a cross-sectional view of the exemplary second cone of FIG. 16 provided with an exemplary fiber ring, the cross-sectional view is taken across plane 17—17 of FIG. 16 (with the addition of the fiber ring).

DETAILED DESCRIPTION

The present application claims priority from U.S. provisional application Ser. No. 60/426,619, filed on Nov. 15, 2002 titled: OIL WELL STUFFING BOX PACKING of Scott C. Lappin.

Figure 1:
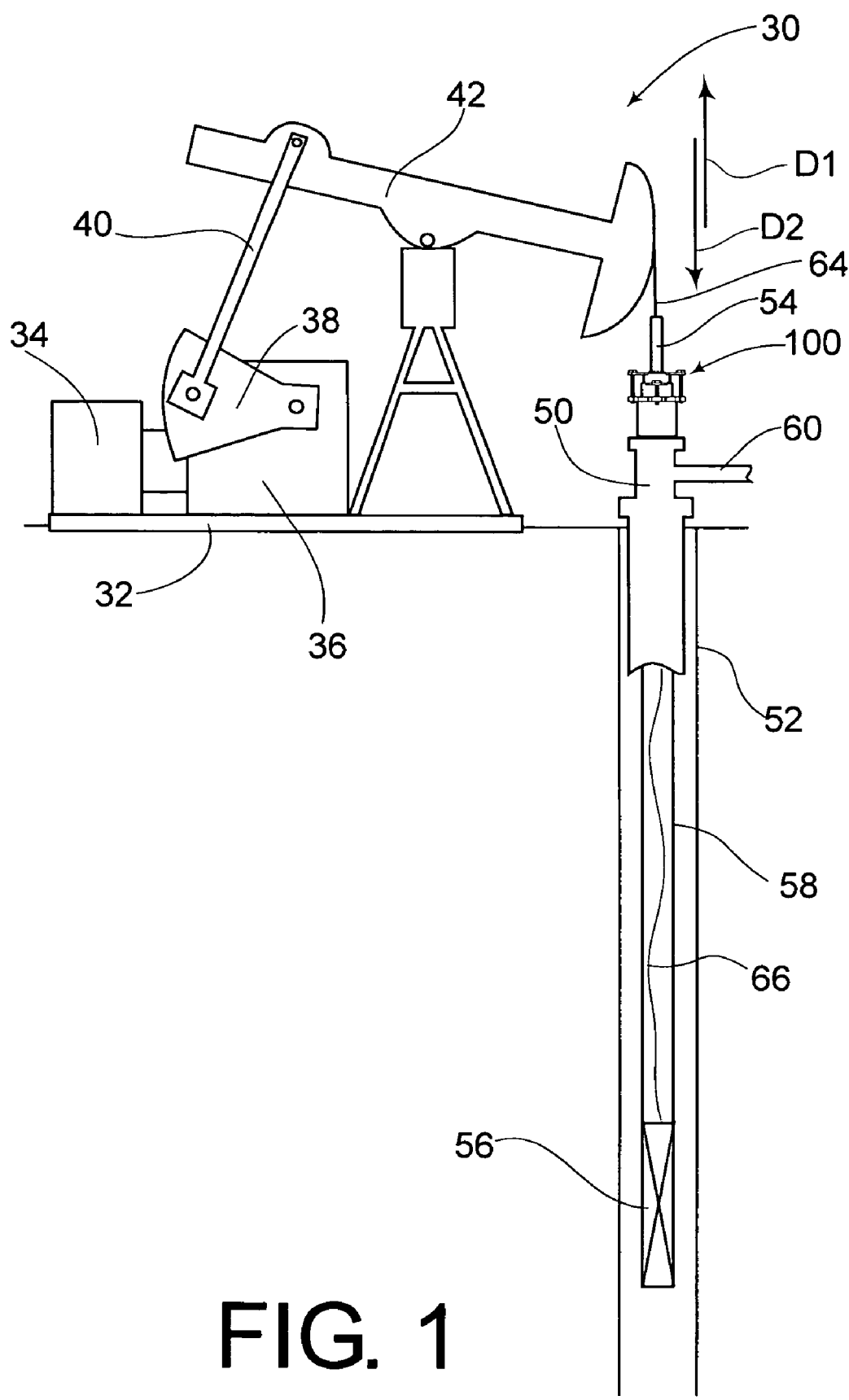
FIG. 1 shows a schematic side elevation view of an exemplary liquid well, referred to as an oil well, provided with a stuffing box.

Disclosed herein are apparatus and methods for sealing a well stuffing box. It is noted that may types of wells exist such as, for example, oil wells. With reference to FIG. 1, an oil well 30 may be provided with a base 32. The oil well 30 may be further provided with a motor 34, a gearbox 36, counterbalance 38, a crank arm 40 and a pump arm 42. The motor 34, gearbox 36, counterbalance 38, crank arm 40 and pump arm 42 may be somewhat attached to the oil well base 32. The motor 34 may create rotational energy that is fed to the gearbox 36. The gearbox 36 may increase the torque of this rotational energy by reducing the speed of the rotation. The gearbox 36 may rotationally drive the counterbalance 38, which, in turn, may drive the crank arm 40. Driving of the crank arm 40 may cause a "teeter-totter" movement of the pump arm 42. This teeter-totter movement of the pump arm 42 may be utilized for pumping liquid such as oil from the earth.

The oil well 30 may be further provided with a wellhead 50, a casing 52, a polish rod 54, a pump 56, a tubing string 58, an output pipe 60, a bridal 64 and a rod string 66. The wellhead 50 may be located above-ground and connected to the tubing string 58 (below-ground) that is located within the casing 52. Movement of the pump arm 42 may be transferred to the bridal 64, which, in turn, is transferred to the polish rod 54. Movement of the polish rod 54 may be utilized for operating the pump 56 via the rod string 66. The pump 56 collects liquid (such as water and oil) contained within the earth, pressurizes this liquid and transfers this liquid to the wellhead 50 via the tubing string 58.

With continued reference to FIG. 1, the oil well wellhead 50 may be provided with the output pipe 60 and a stuffing box 100. The output pipe 60 may be placed in fluid communication with the tubing string 58 via the wellhead 50. The stuffing box 100 may be formed on the wellhead 50. The stuffing box 100 may receive the polish rod 54; and therefore allow the polish rod 54 to translate therein without leaking the pumped liquid. The detailed description of one exemplary embodiment of this stuffing box 100 will now be provided.

Figure 2:
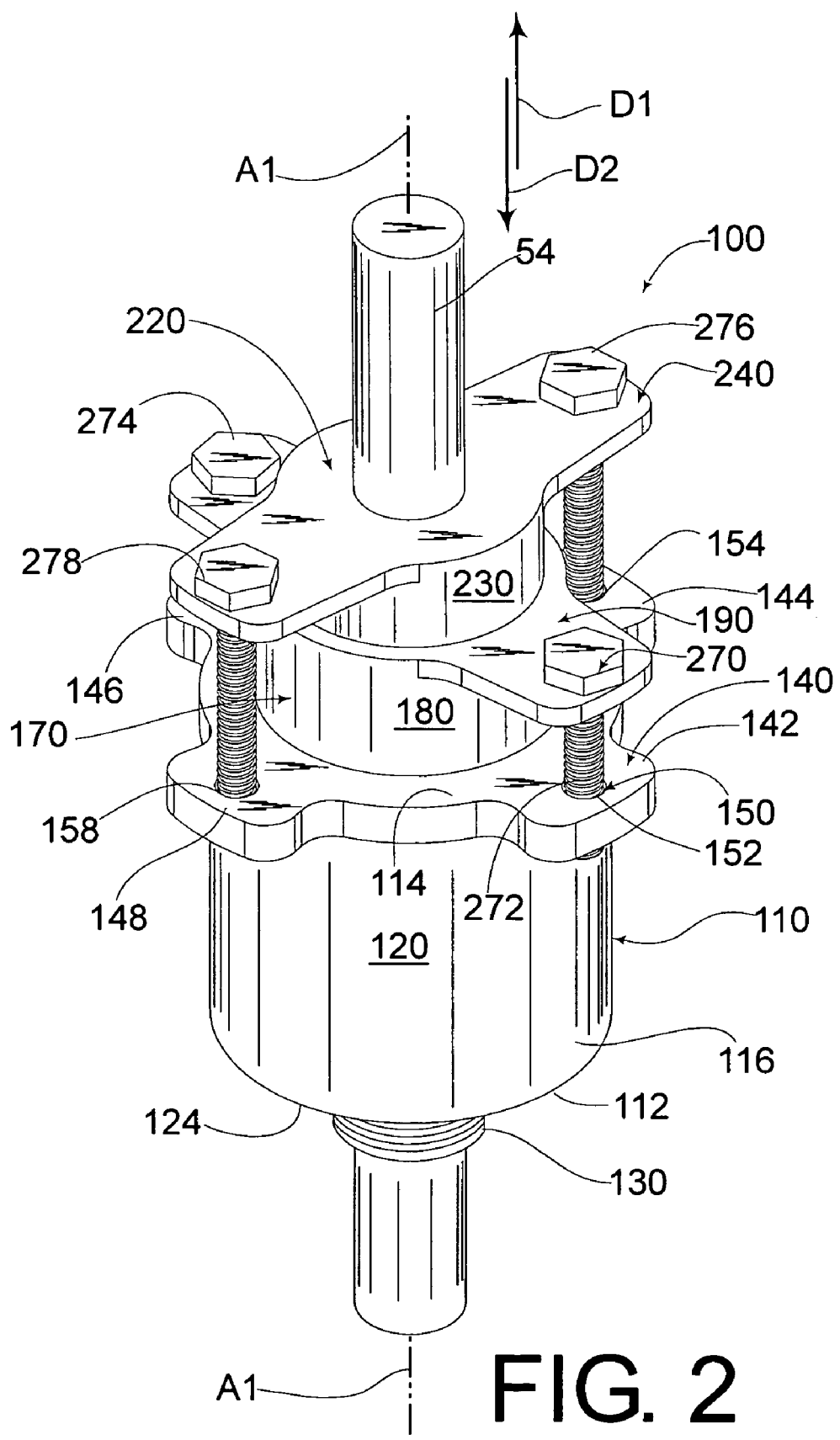
FIG. 2 shows a perspective view of an exemplary stuffing box.

With reference to FIG. 2 illustrating one exemplary embodiment, the stuffing box 100 may be provided with a housing 110, a first gland 170 and a second gland 220. This stuffing box 100 may define a first axis A1. This first axis A1 may be located at the approximate geometric center of the stuffing box 100. The stuffing box housing 110 may be provided with a first end 112 and an oppositely disposed second end 114. The housing 110 may be further provided with a cylindrical body 116 having an internal surface 118 (FIG. 6) and an oppositely disposed external surface 120. The first end 112 may define an internal surface 122 (FIG. 6) and an oppositely disposed external surface 124. The first end internal surface 122 (FIG. 6) may be integrally formed on the housing cylindrical body 116. The first end 112 may be provided with a connection 130. The connection 130 may be provided for attaching the stuffing box 100 to the wellhead 50 (FIG. 1). One exemplary method of attaching the stuffing box 100 to the wellhead 50 may be to threadingly engage these components.

Figures 3, 4:
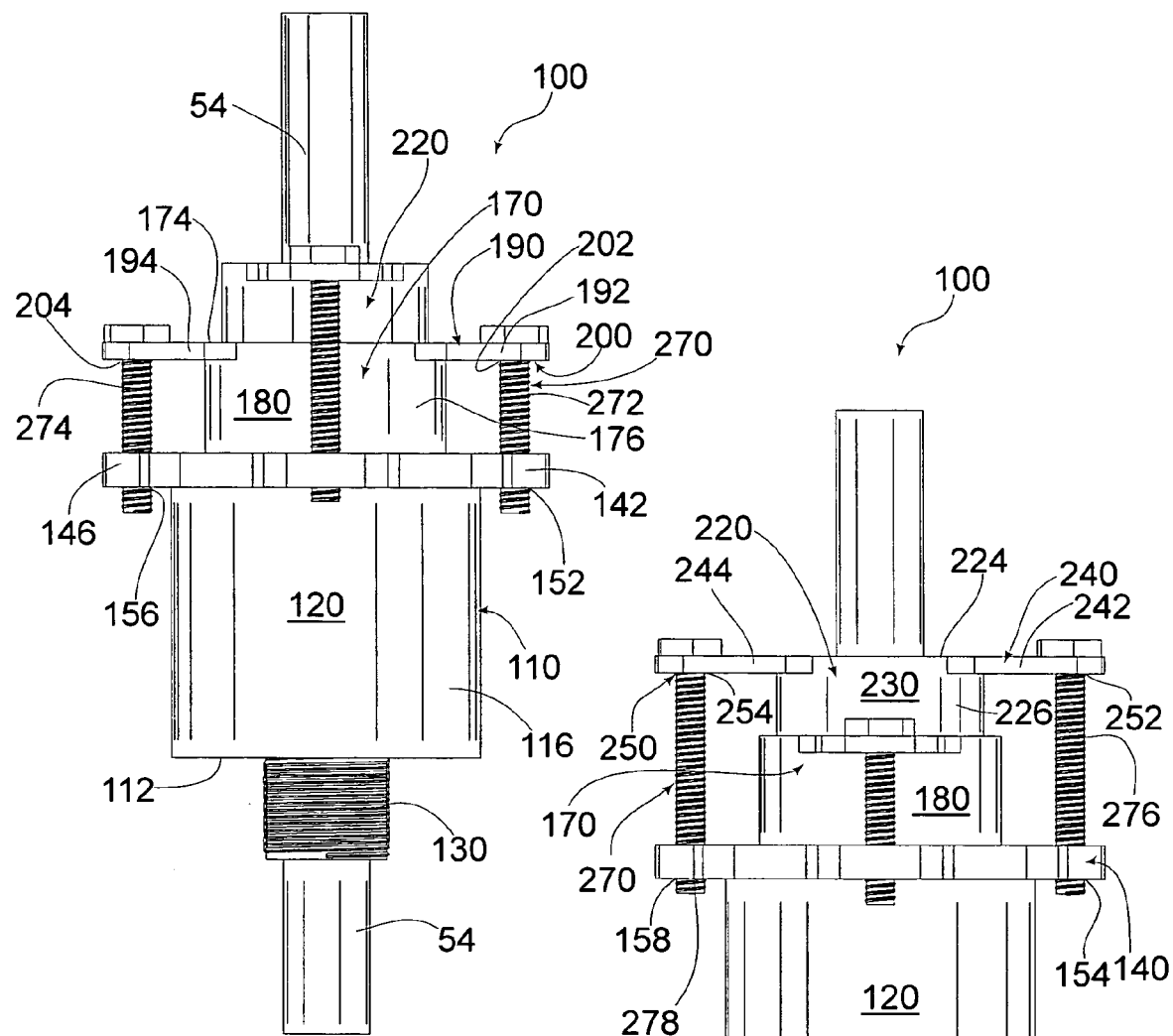
FIG. 3 shows a first side elevation view of the exemplary stuffing box illustrated in FIG. 2.
FIG. 4 shows a second side elevation view of the exemplary stuffing box illustrated in FIG. 2.

The stuffing box housing 110 may be further provided with a plurality of flanges 140, such as a first flange 142, a second flange 144, a third flange 146 and a fourth flange 148. The plurality of flanges 140 may be formed on the housing cylindrical body 116 such that they protrude from the cylindrical body external surface 120 near the second end 114. The housing flanges 140 may be provided with a plurality of threaded holes 150. The first flange 142 may be provided with a first threaded hole 152. The second flange 144 may be provided with a second threaded hole 154. The third flange 146 may be provided with a third threaded hole 156 (FIG. 3). The fourth flange 148 may be provided with a fourth threaded hole 158.

With reference to FIG. 3, the stuffing box 100 may be further provided with the first gland 170. The first gland 170 may be provided with a first end 172 (FIG. 6) and an oppositely disposed second end 174. The portion located between the first gland first and second ends 172, 174 may be referred to herein as a cylindrical body 176. The first gland cylindrical body 176 may define an internal surface 178 (FIG. 6) and an oppositely disposed external surface 180. With continued reference to FIG. 3, the first gland 170 may be provided with a plurality of flanges 190, such as a first flange 192 and a second flange 194. The plurality of flanges 190 may be formed on the first gland cylindrical body 176 such that they protrude from the cylindrical body external surface 180 near the second end 174. The first gland flanges 190 may be provided with a plurality of clearance holes 200. The first gland first flange 192 may be provided with a first clearance hole 202. The first gland second flange 194 may be provided with a second clearance hole 204.

With reference to FIG. 4, the stuffing box 100 may be further provided with the second gland 220. The second gland 220 may be provided with a first end 222 (FIG. 7) and an oppositely disposed second end 224. The portion located between the second gland first and second ends 222, 224 may be referred to herein as a cylindrical body 226. The second gland cylindrical body 226 may define an internal surface 228 (FIG. 7) and an oppositely disposed external surface 230. With continued reference to FIG. 4, the second gland 220 may be provided with a plurality of flanges 240, such as a first flange 242 and a second flange 244. The plurality of flanges 240 may be formed on the second gland cylindrical body 226 such that they protrude from the cylindrical body external surface 230 near the second end 224. The second gland flanges 240 may be provided with a plurality of clearance holes 250. The second gland first flange 242 may be provided with a first clearance hole 252. The second gland second flange 244 may be provided with a second clearance hole 254.

When assembled as illustrated in FIGS. 2–5, the exemplary components of the stuffing box 100 may be configured such that the first gland cylindrical body external surface 180 slidingly contacts the housing cylindrical body internal surface 118 (FIG. 6). With reference to FIG. 6 illustrating a cross-sectional view of the stuffing box 100 taken across plane 6—6 of FIG. 5, this configuration may result in the first gland first end 172 being positioned within the housing 110. The first gland flanges 190 may be aligned with the housing flanges 140. The first gland 170 may be secured to the housing 110 via a plurality of screws 270, such as a first screw 272 and a second screw 274. The first screw 272 may be positioned through the first gland first flange first clearance hole 202 and threaded into the housing first flange first threaded hole 152. The second screw 274 may be positioned through the first gland second flange second clearance hole 204 and threaded into the housing third flange third threaded hole 156. In a process that will be described in detail later herein, the first and second screws 272, 274 may be turned to cause movement of the first gland 170 relative to the housing 110.

Figure 5:
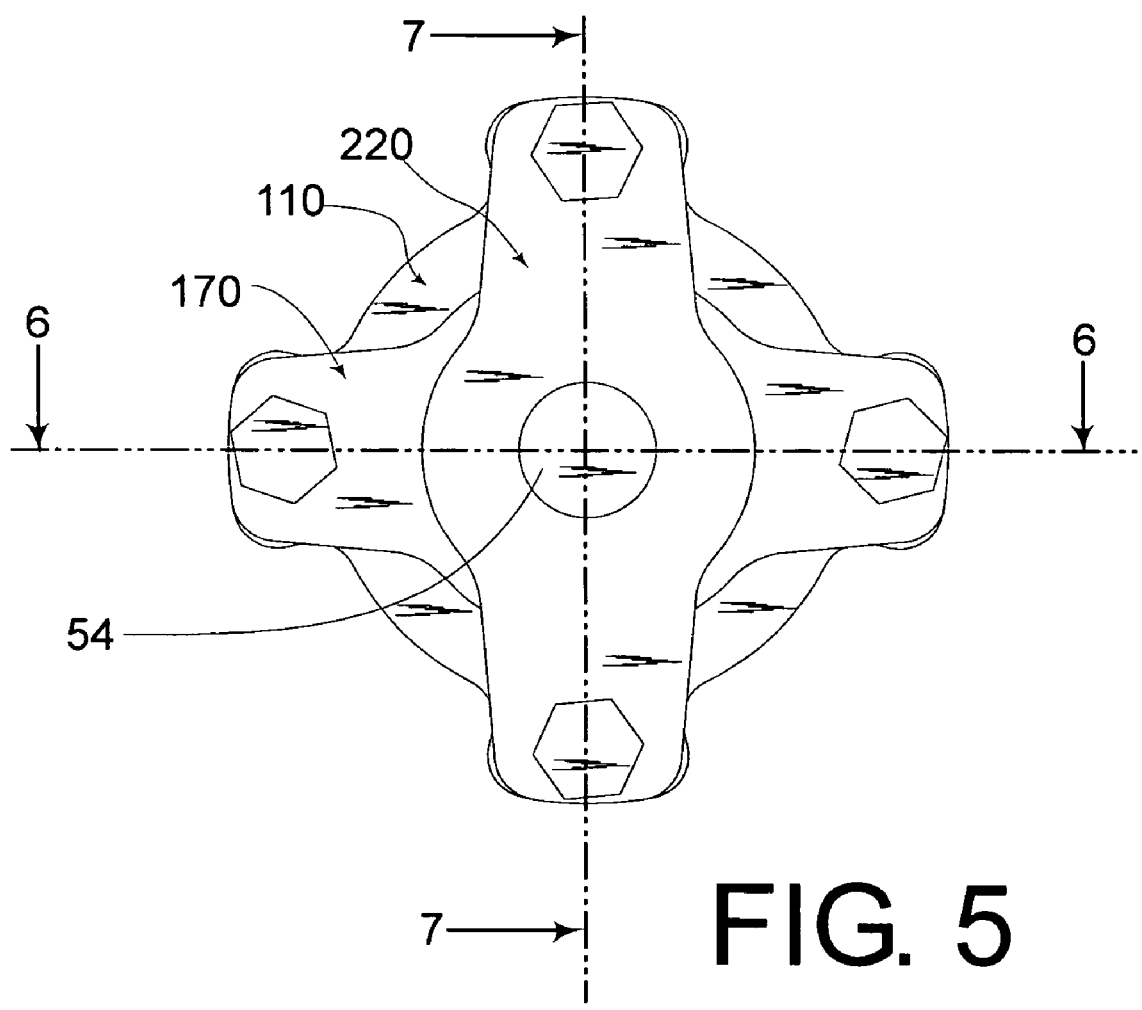
FIG. 5 shows a top plan view of the exemplary stuffing box illustrated in FIG. 2.

With reference to FIG. 7 illustrating a cross-sectional view of the stuffing box 100 taken across plane 7—7 of FIG. 5, the second gland cylindrical body external surface 230 may slidingly contact the first gland cylindrical body internal surface 178. This configuration may result in the second gland first end 222 being positioned within the first gland 170. The second gland flanges 240 may be aligned with the housing flanges 140. The second gland 220 may be secured to the housing 110 via the plurality of screws 270, such as a third screw 276 and a fourth screw 278. The third screw 276 may be positioned through the second gland first flange first clearance hole 252 and threaded into the housing second flange second threaded hole 154. The fourth screw 278 may be positioned through the second gland second flange second clearance hole 254 and threaded into the housing fourth flange fourth threaded hole 158. In a process that will be described in detail later herein, the third and fourth screws 276, 278 may be turned to cause movement of the second gland 220 relative to the first gland 170 and the housing 110.

Figure 8:
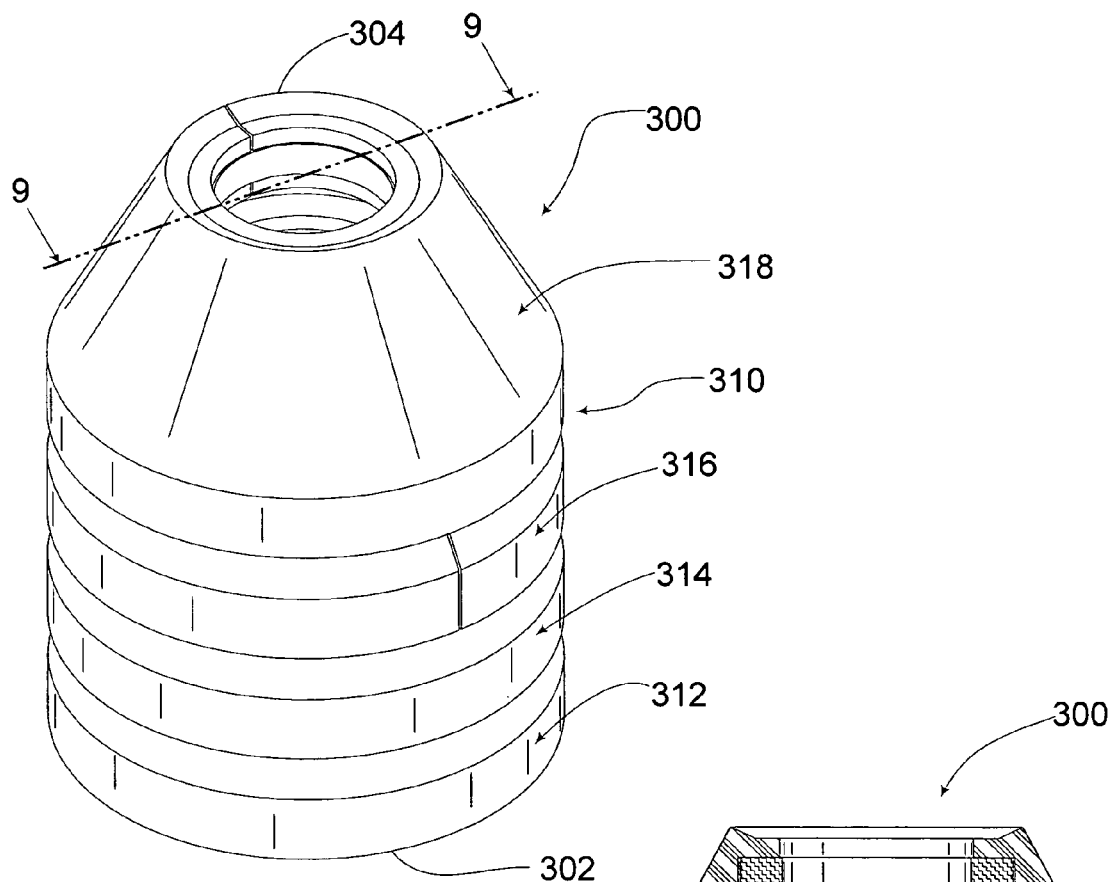
FIG. 8 shows a perspective view of an exemplary packing assembly.
Figure 20:
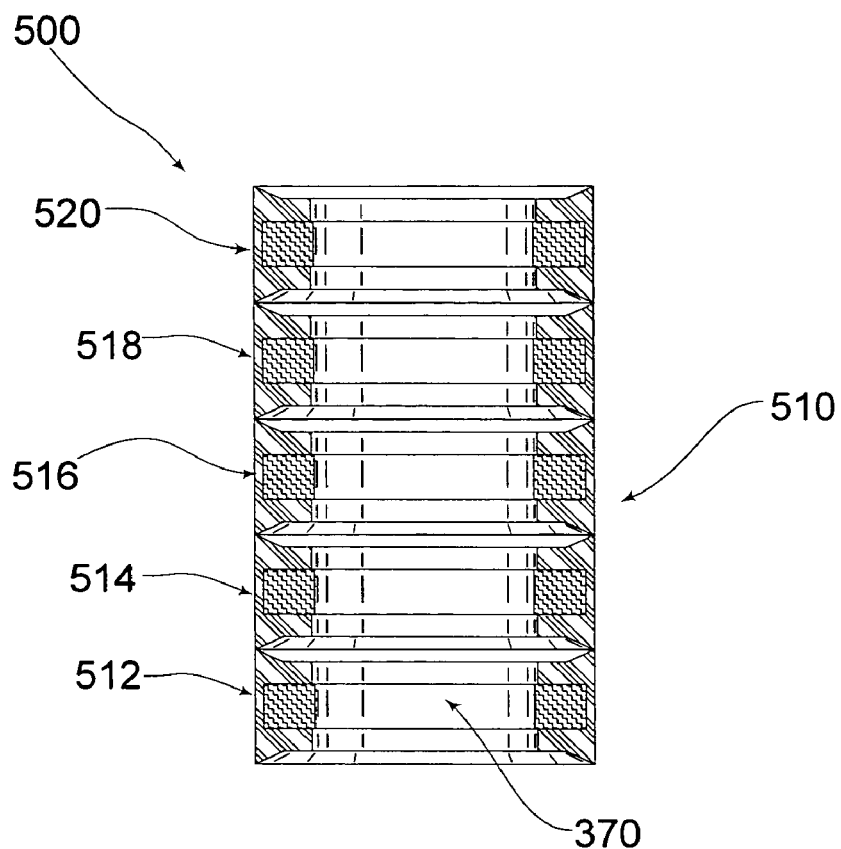
FIG. 20 shows a cross-sectional view of an exemplary packing assembly.
Figure 21:
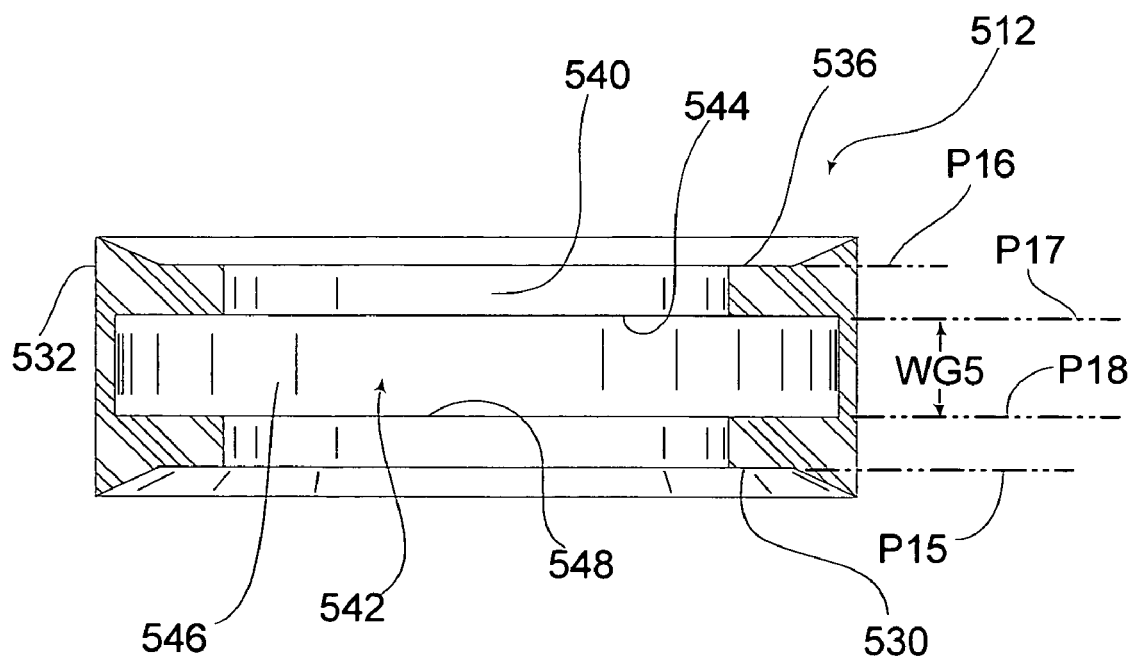
FIG. 21 shows a cross-sectional view of an exemplary first cone of FIG. 20.

With reference to FIG. 6, the stuffing box 100 may be further provided with a packing assembly 300. With reference to FIG. 8 illustrating a perspective view of an exemplary packing assembly 300, the packing assembly 300 may be provided with a first end 302 and an oppositely disposed second end 304. The packing assembly 300 may contain a plurality of packing cones 310, such as a first cone 312, a second cone 314, a third cone 316 and a fourth cone 318. As used herein, the term "cones" may be utilized to describe one type of geometry of packing rubbers. The term "packing rubber" is used to describe articles of manufacture that are used in well stuffing boxes. It should be noted that this arrangement of the cones 310 may be modified by increasing or decreasing the number of cones 310 used, and, for example, changing the shapes of the packing cones. For example, FIGS. 20 and 21 illustrate a crown-ring assembly 500 including packing rubbers configured as 'disks' rather than cones.

Figure 9:
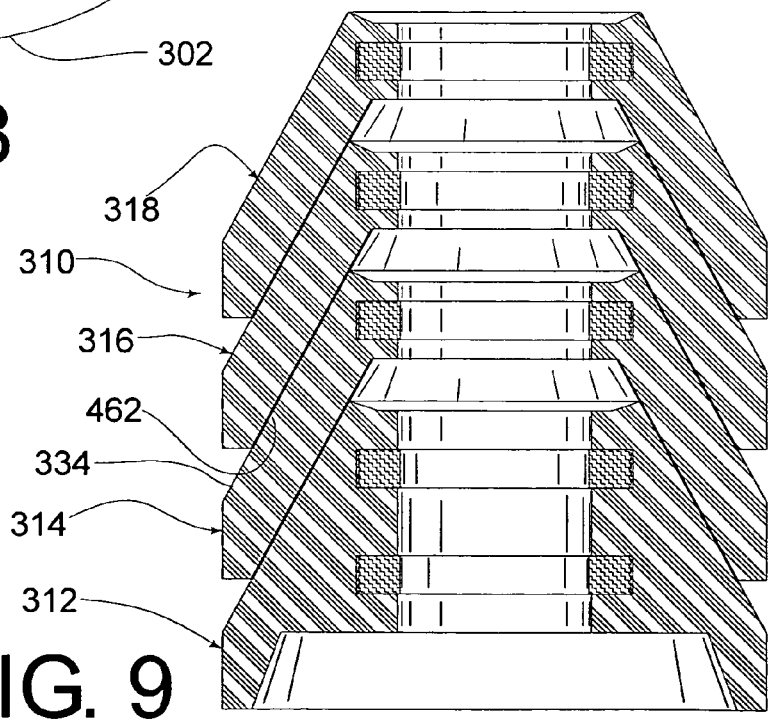
FIG. 9 shows a cross-sectional view of the exemplary packing assembly of FIG. 8 taken across plane 9—9 of FIG. 8.

As illustrated in FIG. 9 showing a cross-section view taken across plane 9—9 in FIG. 8, the first cone 312 may serve as a foundation upon which the second, third, and fourth cones 314, 316, 318 may be stacked. It should be noted that the cones 310 may be composed of any of a variety of rubber or rubber-like materials. Rubber-like materials may include a variety of synthetic substances (sometimes modified by chemical treatment to increase its useful properties, such as toughness and resistance to wear). In one exemplary embodiment, the cones 310 may be composed of rubber (either conventional or high temperature), or injection-molded materials such as NITRILE or VITON. These materials may be composites provided with graphite, cotton, TEFLON, brass, or other additives to improve properties.

Figure 10:
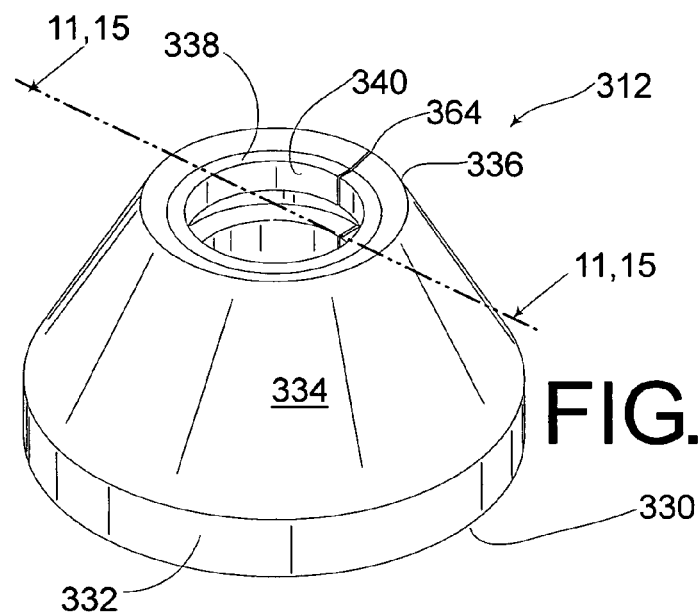
FIG. 10 shows a perspective view of an exemplary first cone.
Figure 11:
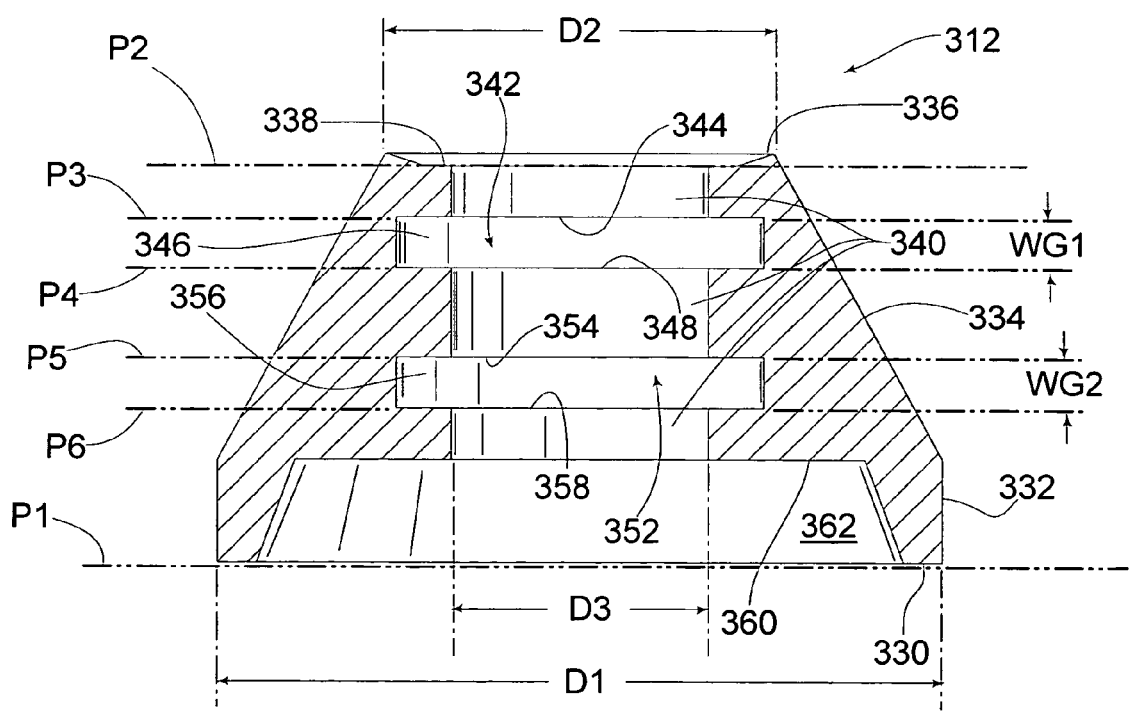
FIG. 11 shows a cross-sectional view of the exemplary first cone of FIG. 10 taken across plane 11—11 of FIG. 10.

With reference to FIG. 11 illustrating a cross-sectional view taken across plane 11—11 in FIG. 10, the first cone 312 may be provided with a base portion 330 that may define a first diameter D1. Additionally, the first cone base portion 330 may define a first plane P1. The first cone 312 may be further provided with an external wall 332 formed somewhat perpendicular to the base portion 330 (i.e. perpendicular to the first plane P1). This external wall 332 may be formed substantially smooth with a constant diameter that is approximately the first diameter D1.

With continued reference to FIG. 11, the first cone 312 may be further provided with a conical surface 334. The first cone conical surface 334 may be formed adjoining the external wall 332. The first cone 312 may also be provided with a vertex portion 336. The first cone vertex portion 336 may define a second diameter D2. In one exemplary embodiment, the second diameter D2 may be less than the first diameter D1. The first cone 312 may be further provided with a top surface 338 adjoining the vertex portion 336. The first cone top surface 338 may define a second plane P2. In one exemplary embodiment, the second plane P2 may be substantially parallel to the first plane P1. The first cone 312 may be further provided with a hole 340. The first cone hole 340 may define a third diameter D3. The first cone hole 340 may adjoin the first cone top surface 338. Additionally, the hole 340 may be substantially perpendicular to the first cone base portion 330 (i.e. perpendicular to the first plane P1).

With continued reference to FIG. 11, the first cone 312 may be further provided with a first annular groove 342. As used herein, the term 'annular groove' refers to a recessed area located on an otherwise flat surface (e.g. first annular groove 342 being formed in hole 340). The first annular groove 342 may be formed in the hole 340 somewhat near (but offset from) the first cone top surface 338. The first cone first annular groove 342 may be provided with a first edge 344, a wall 346 and a second edge 348. The first edge 344 may adjoin the hole 340. The first edge 344 may also be formed substantially 'flat', thereby defining a third plane P3. The first cone first annular groove wall 346 may be formed somewhat perpendicular to the first edge 344 and may be substantially parallel to the hole 340. The second edge 348 may adjoin the first annular groove wall 346 and the hole 340. The second edge 348 may also be formed substantially 'flat', thereby defining a fourth plane P4. In one exemplary embodiment, the third and fourth planes P3, P4 may be substantially parallel to each other. The third and fourth planes P3, P4 may be separated by first annular groove width denoted by WG1 in FIG. 11. In one exemplary embodiment, this first annular groove width WG1 may be about 0.25 inches. Additionally, the third and fourth planes P3, P4 may be substantially parallel to the first plane P1 (although various alternative embodiments described later herein may be configured with the third and fourth planes P3, P4 transverse to the first plane as illustrated in FIG. 11).

With continued reference to FIG. 11, the first cone 312 may be further provided with a second annular groove 352. The second annular groove 352 may be formed in the hole 340 somewhat between the first annular groove 342 and the base portion 330. The first cone second annular groove 352 may be provided with a third edge 354, a wall 356 and a fourth edge 358. The third edge 354 may-adjoin the hole 340. The third edge 354 may also be formed substantially 'flat', thereby defining a fifth plane P5. The first cone second annular groove wall 356 may be formed somewhat perpendicular to the third edge 354 and may be substantially parallel to the hole 340. The fourth edge 358 may adjoin the second annular groove wall 356 and the hole 340. The fourth edge 358 may also be formed substantially 'flat', thereby defining a sixth P6. In one exemplary embodiment, the fifth and sixth planes P5, P6 may be substantially parallel to each other. Additionally, the fifth and sixth planes P5, P6 may be substantially parallel to the first-plane P1, the third plane P3 and the fourth plane P4. The fifth and sixth planes P5, P6 may be separated by second annular groove width denoted by WG2 in FIG. 11. In one exemplary embodiment, this second annular groove width WG2 may be about 0.25 inches.

Figure 12:
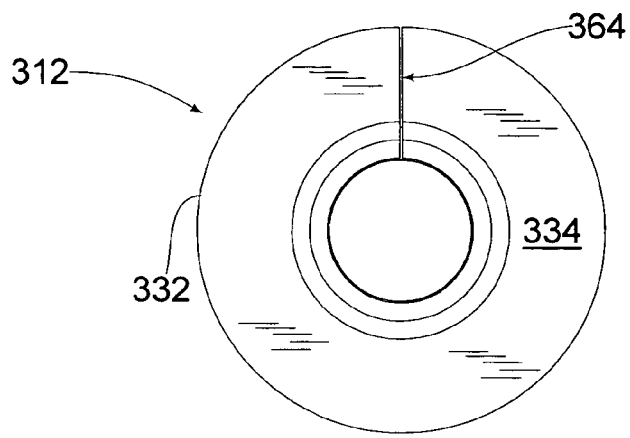
FIG. 12 shows a top plan view of the exemplary first cone of FIG. 10.

The first cone 312 may be further provided with a stepped portion 360. The stepped portion 360 may adjoin the hole 340. The first cone 312 may also be provided with an internal wall 362. The first cone internal wall 362 may adjoin the stepped portion 360 and the first cone base portion 330. With reference to FIG. 12 illustrating a top plan view of the exemplary first cone 312, the first cone 312 may be provided with a split 364. The split 364 may allow the first cone 312 to be installed over a section of the polish rod 54 (FIG. 1) in a process that will be described later herein.

FIG. 15 illustrates a cross-sectional view of the first cone 312 taken across plane 15—15 in FIG. 10. With reference to FIG. 15, the first cone 312 may be provided with a plurality of fiber rings 368, such as a first fiber ring 370 and a second fiber ring 390. As used herein, the term 'fiber ring' means a plurality of fibers consolidated to make a conglomerate fiber ring (e.g. the first fiber ring 370).

Figure 13:
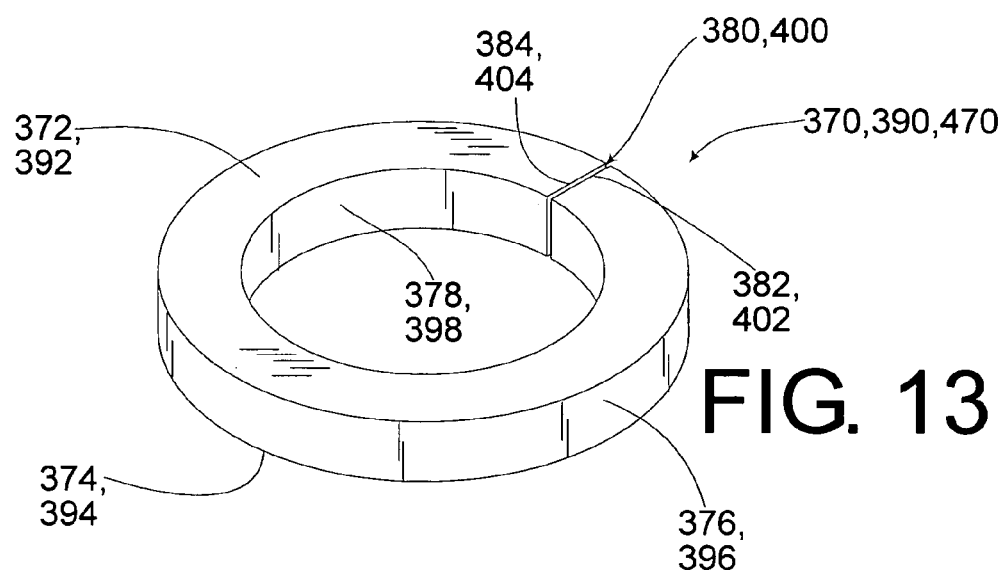
FIG. 13 shows a perspective view of an exemplary fiber ring.
Figure 14:
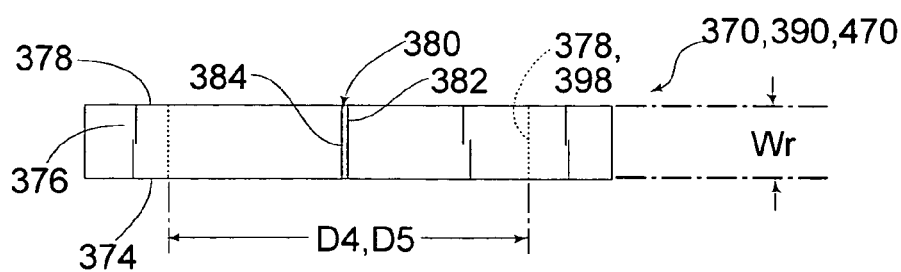
FIG. 14 shows a side elevation view of the exemplary fiber ring illustrated in FIG. 13.

FIG. 13 illustrates a perspective view of the first fiber ring 370. With reference to FIG. 13, the first fiber ring 370 may be provided with a first end 372 and an oppositely disposed second end 374. The first fiber ring 370 may be further provided with an outer wall 376 and an inner wall 378. The outer and inner walls 376, 378 may extend between the first fiber ring first and second ends 372, 374. The first fiber ring 370 may define a ring thickness denoted as Wr in FIG. 14. This ring thickness Wr may be about equal to the first annular groove width WG1 (FIG. 11). In one exemplary embodiment, the first fiber ring 370 may be provided with a split 380, thereby resulting in a first surface 382 and a second surface 384. When the split first and second surfaces 382, 384 adjoin each other, the first fiber ring 370 may take the form of a "ring". As illustrated in FIG. 14, this "ring-like" first fiber ring 370 may define a fourth diameter D4 (extending between oppositely disposed sides of the inner wall 378). In one exemplary embodiment, the third diameter D3 (FIG. 11, defined by the first cone hole 340) may be greater than the fourth diameter D4 (FIG. 14, defined by the first fiber ring inner wall 378) until the first cone 312 is installed onto the polish rod 54 (FIG. 1).

With reference to FIG. 15, the first fiber ring 370 may be positioned in the first cone first annular groove 342. When placed in the first annular groove 342, the first fiber ring first end 372 may adjoin the first annular groove first edge 344. Additionally, the first fiber ring outer wall 376 may adjoin the first annular groove wall 346. The first fiber ring second end 374 may adjoin the first annular groove second edge 348. It should be noted that this first fiber ring 370 (and other fiber rings 368) may be adhered into the first annular groove 342, or remain removable therefrom. If the first fiber ring 370 is adhered into the first annular groove 342, any one of a variety of adhesives may be used such as, for example, wet adhesives, hot-melt adhesives, pressure-sensitive adhesives and reaction adhesives, or, alternatively may be held in place by friction between the fiber ring 370 and the first annular groove 342. Furthermore, if the first fiber ring 370 is adhered into the first cone first annular groove 342, the first fiber ring split 380 (FIG. 13) may be aligned with the first cone split 364 (FIG. 12).

With reference to FIG. 15, the first cone 312 may be provided with the second fiber ring 390. In one exemplary embodiment, the second fiber ring 390 may be substantially similar to the first fiber ring 370. The second fiber ring 390 may be provided with a first end 392 and an oppositely disposed second end 394. The second fiber ring 390 may be further provided with an outer wall 396 and an inner wall 398. The outer and inner walls 396, 398 may extend between the second fiber ring first and second ends 392, 394. With reference to FIG. 13, in one exemplary embodiment, the second fiber ring 390 may be provided with a split 400, thereby resulting in a first surface 402 and a second surface 404. When the split first and second surfaces 402, 404 adjoin each other, the second fiber ring 390 may take the form of a "ring". As illustrated in FIG. 14, this ring-like second fiber ring 390 may define a fifth diameter D5 (extended between oppositely disposed sides of the inner wall 398). In one exemplary embodiment, the third diameter D3 (defined by the first cone hole 340) may be greater than the fifth diameter D5 (FIG. 11, defined by the second fiber ring inner wall 398).

With reference to FIG. 15, the second fiber ring 390 may be positioned in the first cone second annular groove 352. When placed in the second annular groove 352, the second fiber ring first end 392 may adjoin the second annular groove first edge 354. Additionally, the second fiber ring outer wall 396 may adjoin the second annular groove wall 356. The second fiber ring second end 394 may adjoin the second annular groove second edge 358.

The fiber rings 368 (e.g. first fiber ring 370 and second fiber ring 390) may be composed of a variety of materials that are capable of being slightly compressed. The fact that these fiber rings 368 may be made of a compressable material indicates that they may be inhearntly 'soft.' As used herein, the term 'soft' defines any material that can be folded along a fold line and returned to its natural configuration without retaining the fold line. Some of these materials include, but are not limited to: graphite fibers, KEVLAR fibers, carbon fibers, polytetrafluorethylene fibers, white oakum fibers, silica fibers, aramid fibers, ceramic fibers, metal fibers, nylon fibers, cotton fibers, hemp fibers, etc. Additionally, the fiber rings 368 may be impregnated with materials for improving performance such as flax, polytetrafluorethylene (PTFE), graphite particles, petroleum distillates, grease, etc. In one exemplary embodiment, a fiberglass core with acrylic yarn impregnated with TEFLON and/or graphite has been successfully employed. In another exemplary embodiment, a fiberglass core with acrylic yarn and KEVLAR fibers impregnated with TEFLON and/or graphite has also been successfully employed. In yet another exemplary embodiment, nylon impregnated with TEFLON has been successfully employed. These fiber rings 368 may be manufactured from material having any on a variety of cross-sectional shapes such as, for example, square, rectangular, circular, elliptical or other shapes. In one particular exemplary embodiment, the fiber rings 368 may be made from a spool of square-shaped fibrous material of nylon impregnated with TEFLON.

With reference to FIG. 16, the second cone 314 (which may overlie or be nested on top of the first cone 312 as described later herein) may be provided with a base portion 430 that may define a sixth diameter D6 (FIG. 17). With reference to FIG. 17 illustrating a cross-sectional view taken across plane 17—17 of FIG. 16, the second cone base portion 430 may define a seventh plane P7. The second cone 314 may be further provided with an external wall 432 formed somewhat perpendicular to the base portion 430 (i.e. perpendicular to the seventh plane P7). This external wall 432 may be formed substantially smooth with a constant diameter that is about the sixth diameter D6. The second cone 314 may be further provided with a conical surface 434. The second cone conical surface 434 may be formed adjoining the external wall 432. The second cone 314 may also be provided with a vertex portion 436. With continued reference to FIG. 17, the second cone vertex portion 436 may define a seventh diameter D7. The seventh diameter D7 may be less than the sixth diameter D6.

The second cone 314 may be further provided with a top surface 438 adjoining the vertex portion 436. The second cone top surface 438 may define an eighth plane P8. In one exemplary embodiment, the eighth plane P8 may be substantially parallel to the seventh plane P7. The second cone 314 may be further provided with a hole 440. The second cone hole 440 may define an eighth diameter D8. The second cone hole 440 may adjoin the second cone top surface 438. The hole 440 may be substantially perpendicular to the second cone base portion 430 (i.e. perpendicular to the seventh plane P7).

With reference to FIG. 16, the second cone 314 may be further provided with a first annular groove 442. The first annular groove 442 may be formed in the hole 440 somewhat near (but offset from) the second cone top surface 438. The second cone first annular groove 442 may be provided with a first edge 444, a wall 446 and a second edge 448. The first edge 444 may adjoin the hole 440. The first edge 444 may also be formed substantially 'flat', thereby defining a ninth plane P9 (FIG. 17). The second cone first annular groove wall 446 may be formed somewhat perpendicular to the first edge 444 and may be substantially parallel to the hole 440. The second edge 448 may adjoin the first annular groove wall 446 and the hole 440. The second edge 448 may also be formed substantially 'flat', thereby defining a tenth plane P10 (FIG. 17).

With reference to FIG. 17, in one exemplary embodiment, the ninth and tenth planes P9, P10 may be substantially parallel to each other. Additionally, the ninth and tenth planes P9, P10 may be substantially parallel to the seventh plane P7. The second cone 314 may be further provided with a stepped portion 460. The stepped portion 460 may adjoin the hole 440. The second cone 314 may also be provided with an internal wall 462. The second cone internal wall 462 may adjoin the stepped portion 460 and the second cone base portion 430. With reference to FIG. 16, the second cone 314 may be provided with a split 464. The split 464 may allow the second cone 314 to be installed over a section of the polish rod 54 (FIG. 1) in a process that will be described later herein.

With reference to FIG. 17, the second cone 314 may be provided with a third fiber ring 470 that may be substantially similar to the first fiber ring 370. Therefore, the third fiber ring 470 may adopt the reference numerals used to describe the first fiber ring 370. With reference to FIG. 17, the third fiber ring 470 may be positioned in the second cone first annular groove 442. When placed in the first annular groove 442, the third fiber ring first end 372 may adjoin the first annular groove first edge 444. Additionally, the third fiber ring outer wall 376 may adjoin the first annular groove wall 446. The third fiber ring second end 374 may adjoin the first annular groove second edge 448.

As illustrated in FIG. 14, the third fiber ring 390 may define the fifth diameter D5 (extended between oppositely disposed sides of the inner wall 398). In one exemplary embodiment, the eighth diameter D8 (defined by the second cone hole 440) may be greater than the fifth diameter D5 (defined by the third fiber ring inner wall 398).

With reference to FIG. 8, the third cone 316 and fourth cone 318 may be substantially similar to the previously-described second cone 314. Therefore, when referencing elements of the third and fourth cones 316, 318, the description of elements of the second cone 314 may be utilized. For example and with reference to FIG. 9, the second cone conical surface 334 may be adjoining the internal wall of the third cone 316.

Having described several exemplary elements of one exemplary embodiment of the stuffing box 100 and the packing assembly 300, the process of assembling these elements will now be provided.

With reference to FIG. 6, when assembled together, the stuffing box housing 110, first gland 170 and second gland 220 may form a cavity 400. This cavity 400 may be occupied by the packing assembly 300. When occupying the cavity 400, the packing assembly 300 may contact the housing cylindrical body internal surface 118 and the housing first end internal surface 122. Additionally, the packing assembly 300 may also contact the first gland first end 172 and second gland first end 222. This assembly may also result in the polish rod 54 being aligned concentric to the first axis A1, thereby extending through the stuffing box 100. Therefore, the contact between the polish rod 54 and the packing assembly 300 may result in containment of the liquid that is being pumped to the wellhead 50 (FIG. 1).

With reference to FIG. 1, as part of the pumping of liquid from the earth, the polish rod 54 reciprocates within the stuffing box 100. This reciprocating polish rod 54 may be used to operate the pump 56 via the rod string 66. When pumping liquid with the oil well 30, the polish rod 54 may alternate between moving in the first direction D1 and the second direction D2. When moving in the first direction D1 and the second direction D2, the packing assembly 300 keeps the majority of liquid from passing the packing assembly 300.

Over a period of operation, the constant movement of the polish rod 54 wears the packing assembly 300. Therefore, after some period of time, the worn-out packing assembly 300 needs to be replaced.

With reference to FIG. 2, at the outset of a packing replacement process, the first and second glands 190, 220 may be disassembled from the housing 110. This disassembly process may require 'turning' of the plurality of screws 270 to remove them from the plurality of threaded holes 150. After removing the screws 270, the first and second glands 190, 220 may be moved in the first direction D1. After moving the first and second glands 190, 220, the stuffing box cavity 400 (FIG. 6) may be accessible. With reference to FIG. 6, access to the stuffing box cavity 400 allows the worn-out packing assembly 300 to be "slid" in the first direction D1 along the polish rod 54. After the packing assembly 300 has been removed from the stuffing box housing 110, the packing assembly 300 may be removed from the polish rod 54.

The process of removing the packing assembly 300 from the polish rod 54 may involve spreading each of the individual cones 310 to allow their respective holes (e.g. first cone hole 340, FIG. 11) to pass over the polish rod 54. This removal may include spreading the fourth cone 318 by placing fingers on the two surfaces of the split of the fourth cone 318. This spreading may result in the fourth cone 318 being deflected enough to allow it to be urged off of the polish rod 54. This removal may also include spreading the third cone 316 by placing fingers on the two surfaces of the split of the third cone 316. This spreading may result in the third cone 316 being deflected enough to allow it to be urged off of the polish rod 54. Additionally, this removal may include spreading the second cone 314 by placing fingers on the two surfaces of the second cone split 464 (FIG. 16). This spreading may result in the second cone 314 being deflected enough to allow it to be urged off of the polish rod 54. The removal may include spreading the first cone 312 by placing fingers on the two surfaces of the first cone split 364 (FIG. 10). This spreading may result in the first cone 312 being deflected enough to allow it to be urged off of the polish rod 54. If any of the fiber rings (e.g. fiber rings 370, 390, 470) remain on the polish rod 54, they may be removed therefrom.

After removing the worn-out packing assembly 300, a new packing assembly 300 may be installed on the polish rod 54. With reference to FIG. 6, this installation of the new packing assembly 300 may begin by placing the first cone 312 on the polish rod 54. This placement of the first cone 312 may occur by spreading the first cone 312 and positioning it concentric to the first axis A1. This concentric positioning of the first cone 312 may result in the first cone hole 340 (FIG. 11), first fiber ring inner wall 378 (FIG. 13) and second fiber ring inner wall 398 (FIG. 13) contacting the polish rod 54. Additionally, the second cone 314 may be spread and positioned on polish rod 54. When placing the second cone 314 on the polish rod 54, the second cone hole 440 (FIG. 17) and the third fiber ring internal wall 378 (FIG. 13) may adjoin the polish rod 54. Additionally, the first cone 312 and the second cone 314 may be urged together thereby resulting in contact between the first and second cones 312, 314. This contact may result in the first cone conical surface 334 (FIG. 10) contacting the second cone internal wall 462 (FIG. 17). The third and fourth cones 316, 318 may also be assembled onto the polish rod 54 in a manner substantially similar to that described for assembling the first and second cones 312, 314.

After positioning the cones 312 on the polish rod 54, the packing assembly 300 may be moved in the second direction D2 into the stuffing box housing cavity 400 as illustrated in FIG. 6. With reference to FIG. 6, this positioning of the packing assembly 300 in the stuffing box housing cavity 400 may result in the first cone base portion 330 (FIG. 11) contacting the housing first end internal surface 122. Additionally, the first cone external wall 332 (FIG. 11), the second cone external wall 432 (FIG. 16) and the external walls of the third and fourth cones 316, 318 may contact the housing cylindrical wall internal surface 118.

After placing the packing assembly 300 into the housing cavity 400, the first gland 170 may be assembled to the housing 110. When assembling the first gland 170 to the housing 110, the first gland first end 172 may contact the conical surface of the fourth cone 318. As illustrated in FIG. 2, the first gland 170 may be secured to the housing 110 by the first and second screws 272, 274. With reference to FIG. 7, after attaching the first gland 170 to the housing 110, the second gland 220 may be attached to the housing 100. When attaching the second gland 220, the second gland first end 222 may contact the vertex portion of the fourth cone 318. As illustrated in FIG. 2, the second gland 220 may be secured to the housing by the third and fourth screws 276, 278.

As part of the assembly process, the stuffing box housing cavity 400 may be partially filled with grease. This grease may be introduced to the housing cavity 400 by a fitting (not shown) that provides passage from the stuffing box cylindrical wall external surface 120 to the internal surface 118 (FIG. 6).

The first and second glands 190, 220 may be moved in the second direction D2 to compress the packing assembly 300. By compressing the packing assembly 300, the sealing surfaces of the stuffing box 100 may optimized.

Although the present device and methods may be used for any of a variety of sized stuffing box 100, one exemplary application for a 1.75 inch diameter will be provided. In this exemplary embodiment, the first diameter D1 (FIG. 11) may be about 3.5 inches. The second diameter D2 (FIG. 11) may be about 2 inches. The third diameter D3 (FIG. 11) may be about 1.25 inches. The fourth diameter D4 (FIG. 14) may be about 1.75 inches. The fifth diameter D5 (FIG. 14) may be about 1.75 inches. Again, these dimension are provided for illustrative purposes only and may be varied according to application.

The apparatus and methods described herein have proven beneficial in field testing. In particular, wells fitted with conventional packing assemblies often require maintenance every three weeks to three months to replace worn-out packing assemblies. However, when the present apparatus was used in the same wells, the present packing assembly 300 has been performing flawlessly for eleven months (on two of three test wells). At the time of writing this document, the life-span of the present packing assembly 300 remains unknown. This life-span of the present packing assembly 300 is substantially longer than the three to four week life-span of the conventional packing assembly.

Figure 18:
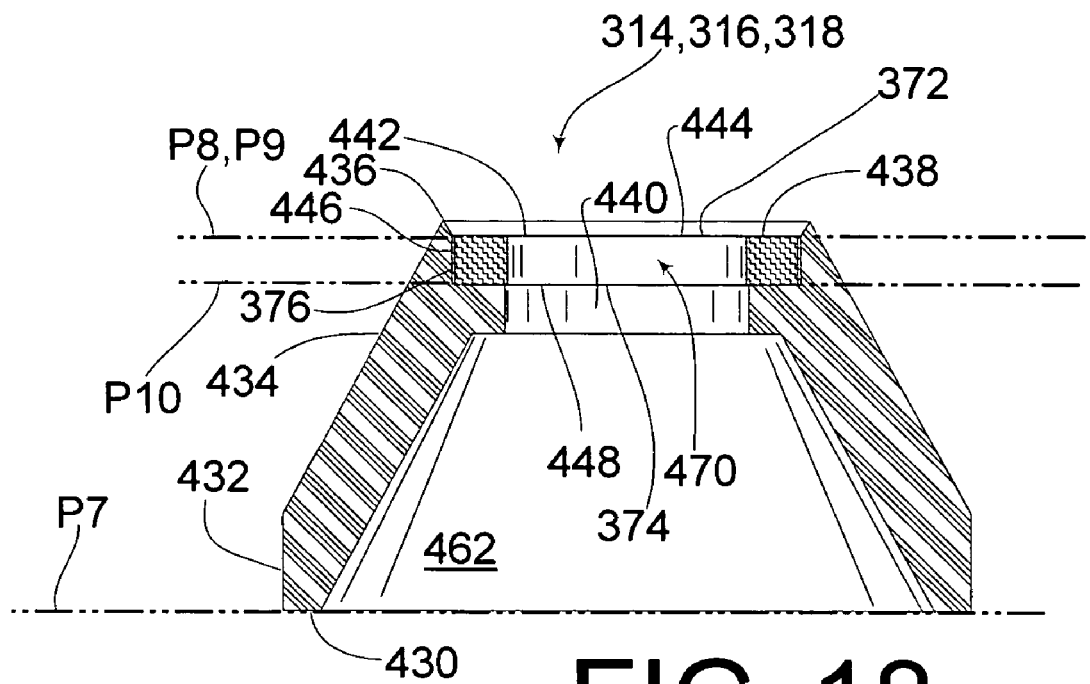
FIG. 18 shows a cross-sectional view of an exemplary second cone.

With reference to FIG. 18, in one exemplary alternative embodiment, the second cone 314 (and the third and fourth cones 316, 318) may be provided with the first annular groove 442 adjacent to the first cone top surface 438. In this alternative embodiment, the first annular groove first edge 444 may be coplanar with the second cone top surface 438. This may result in the eighth plane P8 being substantially coplanar with the ninth plane P9. In a slight variation to this alternative embodiment, the eighth and ninth planes P8, P9 may be separated by a first distance. This first distance may be any dimension, such as, for example 0.125 inches.

Figure 19:
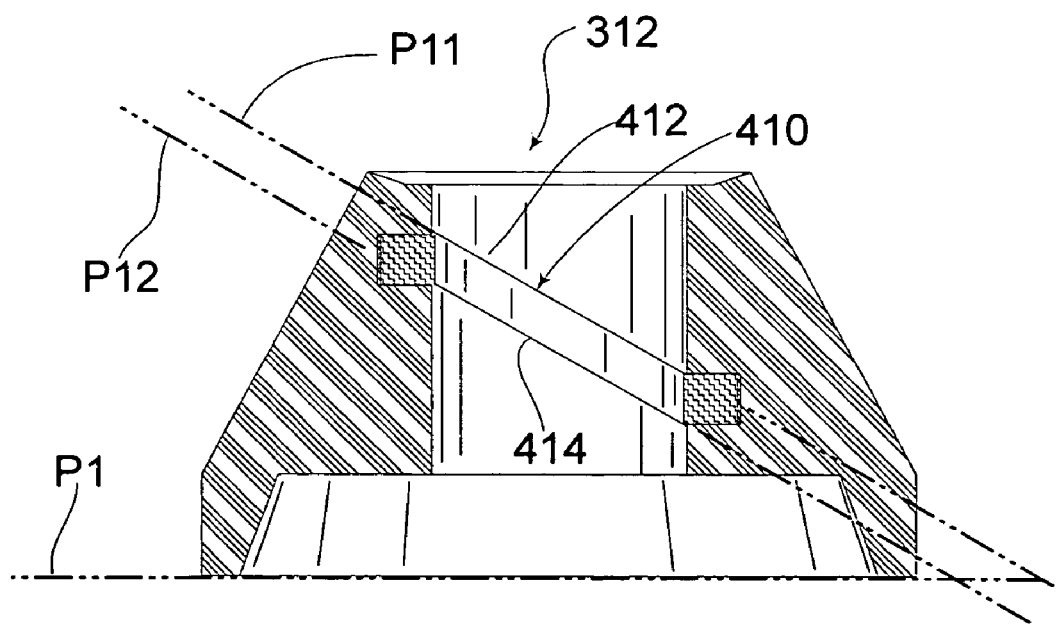
FIG. 19 shows a cross-sectional view of an exemplary first cone provided with an elliptical groove.

With reference to FIG. 19, in another exemplary alternative embodiment, the first cone 312 may be provided with an angled groove 410. The angled groove 410 may be provided with a first edge 412 and an oppositely disposed second edge 414. The first edge 412 may be formed substantially flat, thereby defining an eleventh plane P11. The second edge 414 may be formed substantially flat, thereby defining a twelfth plane P12. The eleventh and twelfth planes P11, P12 may be formed substantially parallel to each other. The eleventh and twelfth planes P11, P12 may be formed such that they intersect the first plane P1 at an angle.

With reference to FIGS. 20 and 21, in another exemplary alternative embodiment, the stuffing box 100 may be further provided with a crown-ring packing assembly 500. This crow-ring packing assembly 500 may be utilized for a variety of applications such as, for example, with rotary pumps. In a rotary pump application, the pumping unit is located downhole and receives its input energy via the polish rod 54. With reference to FIG. 20 illustrating a cross sectional view of the crow-ring packing assembly 500, the packing assembly 500 may be provided with a first end 502 and an oppositely disposed second end 504. The packing assembly 500 may contain a plurality of packing rubbers 510, such as a first rubber 512, a second rubber 514, a third rubber 516, a fourth rubber 518 and a fifth rubber 520. It should be noted that this arrangement of the rubbers 510 may be modified by increasing or decreasing the number of rubbers 510 used, and, for example, changing the shapes of the packing rubbers. As illustrated in FIG. 20 the first rubber 512 may serve as a foundation upon which the second, third, fourth and fifth rubbers 514, 516, 518, 520 may be stacked. It should be noted that the rubbers 510 may be composed of any of a variety of rubber or rubber-like materials as previously described with respect to the cones 310.

With reference to FIG. 21 illustrating a cross-sectional view, the first rubber 512 may be provided with a base portion 530. Additionally, the first rubber base portion 530 may define a fifteenth plane P15. The first rubber 512 may be further provided with an external wall 532 formed somewhat perpendicular to the base portion 530 (i.e. perpendicular to the fifteenth plane P15). This external wall 532 may be formed substantially smooth with a constant diameter.

With continued reference to FIG. 21, the first rubber 512 may be provided with a top portion 536. The first rubber top portion 536 may define a diameter substantially similar to the diameter of the base portion 530. The first rubber top portion 536 may define a sixteenth plane P16. In one exemplary embodiment, the sixteenth plane P16 may be substantially parallel to the fifteenth plane P15. The first rubber 512 may be further provided with a hole 540. The first rubber hole 540 may define a diameter. The first rubber hole 540 may adjoin the first rubber top portion 536. Additionally, the hole 540 may be substantially perpendicular to the first rubber base portion 530 (i.e. perpendicular to the fifteenth plane P15). The first rubber 512 may be further provided with a first annular groove 542. The first annular groove 542 may be formed in the hole 540 somewhat between the first rubber top portion 536 and the base portion 530. The first rubber first annular groove 542 may be provided with a first edge 544, a wall 546 and a second edge 548. The first edge 544 may adjoin the hole 540. The first edge 544 may also be formed substantially 'flat', thereby defining a seventeenth plane P17. The first rubber first annular groove wall 546 may be formed somewhat perpendicular to the first edge 544 and may be substantially parallel to the hole 540. The second edge 548 may adjoin the first annular groove wall 546 and the hole 540. The second edge 548 may also be formed substantially 'flat', thereby defining an eighteenth plane P18. In one exemplary embodiment, the seventeenth and eighteenth planes P17, P18 may be substantially parallel to each other. The seventeenth and eighteenth planes P17, P18 may be separated by first annular groove width denoted by WG5 in FIG. 21.

The first rubber 512 may be provided with a split (not shown). The split may allow the first rubber 512 to be installed over a section of the polish rod 54 (FIG. 1). With reference to FIG. 20, the first rubber 512 may be provided with a fiber ring substantially similar to first fiber ring 370 illustrated in FIG. 13.

It is noted that various trademarks are used within the present specification. Applicant acknowledges that these trademarks are property of their respective owners and reference to these trademarks is for illustrative purposes only. The following trademarks have been utilized herein and are followed by their generic definition: KEVLAR (a type of aramid fiber), TEFLON (polytetrafluoroethylene) and VITON (a synthetic rubber and fluoropolymer elastomer).

While illustrative embodiments have been described in detail herein, it is to be understood that the concepts may be otherwise embodied as previously mention. The appended

I claim:

1. A packing rubber for a well stuffing box defining a first axis, said packing rubber comprising:
   a base portion;
   a top portion oppositely disposed from said base portion;
   a hole along said first axis, said hole extending from said base portion to said top portion;
   an annular groove formed in said hole;
   a fiber ring disposed within said annular groove; and
   wherein said fiber ring is impregnated with at least one lubricant selected from a predetermined group of lubricants consisting of:
   polytetrafluorethylene (PTFE), graphite particles, petroleum distillates and grease.

2. A packing rubber of claim 1 wherein:
   said base portion defining a first diameter; and
   said top portion defies a second diameter that is less than said first diameter.

3. The packing rubber of claim 1 wherein said fiber ring includes at least one fiber selected from a predetermined group of fibers consisting of:
   graphite fibers, carbon fibers, polytetrafluoroethylene fibers, white oakum fibers, silica fibers, aramid fibers, ceramic fibers, wire fibers, nylon fibers, cotton fibers, hemp fibers and acrylic fibers.

4. The packing rubber of claim 1 and further comprising:
   a second annular groove formed in said hole; and
   a second fiber ring disposed within said second annular groove.

5. The packing rubber of claim 1 wherein:
   said base portion defines a first plane; and
   said annular groove defines a second plane that is transverse to said first plane.

6. The packing rubber of claim 1 wherein:
   said hole defines a third diameter; and
   said fiber ring defines a fourth diameter that is less than said third diameter.

7. The packing rubber of claim 1 wherein:
   said annular groove comprises a first planar surface; and
   said annular groove comprises a second planar surface that is parallel to said first planar surface.

8. The packing rubber of claim 7 wherein:
   said fiber ring comprises a first planar surface;
   said fiber ring comprises a second planar surface;
   said fiber ring first planar surface contacts said annular groove first planar surface; and
   said fiber ring second planar surface contacts said annular groove second planar surface.

9. A method of reducing liquid from leaking past a polish rod and a well stuffing box, said method comprising:
   providing a packing rubber defining a first axis, said packing rubber comprising:
      a base portion;
      a top portion oppositely disposed from said base portion;
      a hole along said first axis, said hole extending from said base portion to said top portion;
      an annular groove formed in said hole;
      a fiber ring disposed within said annular groove; and
      an axial cut formed through said packing cone;
   positioning said packing cone around said polish rod;
   wherein said positioning said packing cone also causes compression of said fiber ring; and
   wherein said fiber ring is impregnated with at least one lubricant selected from a predetermined group of lubricants consisting of:
   polytetrafluorethylene (PTFE), graphite particles, petroleum distillates and grease.

10. The method of claim 9 wherein:
    said base portion defines a first diameter; and
    said top portion defines a second diameter that is less than said first diameter until said positioning said packing cone around said polishing rod.

11. A packing assembly for a well stuffing box defining a first axis, said packing assembly comprising at least two packing rubbers, each of said packing rubbers comprising:
    a base portion;
    a top portion oppositely disposed from said base portion;
    a hole along said first axis, said hole extending from said base portion to said top portion;
    an annular groove formed in said hole;
    a fiber ring disposed within said annular groove; and
    wherein said fiber ring is impregnated with at least one lubricant selected from a predetermined group of lubricants consisting of:
    polytetrafluorethylene (PTFE), graphite particles, petroleum distillates and grease.

12. The packing assembly of claim 11 wherein said fiber ring includes at least one fiber selected from a predetermined group of fibers consisting of:
    graphite fibers, carbon fibers, polytetrafluoroethylene fibers, white oakum fibers, silica fibers, aramid fibers, ceramic fibers, wire fibers, nylon fibers, cotton fibers, hemp fibers and acrylic fibers.

13. The packing assembly of claim 11 and further comprising:
    a second annular groove formed in said hole of at least one of said packing rubbers; and
    a second fiber ring disposed within said second annular groove.

14. The packing assembly of claim 11 wherein:
    said base portion defines a first plane; and
    said annular groove defines a second plane that is transverse to said first plane.

15. The packing assembly of claim 11 wherein:
    said hole defines a third diameter; and
    said fiber ring defines a fourth diameter that is less than said third diameter.

16. The packing assembly of claim 11 wherein:
    said annular groove comprises a first planar surface; and
    said annular groove comprises a second planar surface that is parallel to said first planar surface.

17. The packing assembly of claim 16 wherein:
    said fiber ring comprises a first planar surface;
    said fiber ring comprises a second planar surface;
    said fiber ring first planar surface contacts said annular groove first planar surface; and
    said fiber ring second planar surface contacts said annular groove second planar surface.

18. A packing rubber for a well stuffing box defining a first axis, said packing rubber comprising:
    a base portion;
    a top portion oppositely disposed from said base portion;
    a hole along said first axis, said hole extending from said base portion to said top portion;
    an annular groove formed in said hole;
    a fiber ring disposed within said annular groove;
    a second annular groove formed in said hole; and
    a second fiber ring disposed within said second annular groove.

19. A packing rubber of claim 18 wherein:
said base portion defining a first diameter; and
said top portion defies a second diameter that is less than said first diameter.

20. The packing rubber of claim 18 wherein said fiber ring includes at least one fiber selected from a predetermined group of fibers consisting of:
graphite fibers, aramid fibers, carbon fibers, polytetrafluorethylene fibers, white oakum fibers, silica fibers, aramid fibers, ceramic fibers, wire fibers, nylon fibers, cotton fibers, hemp fibers and acrylic fibers.

21. The packing rubber of claim 18 wherein said fiber ring is impregnated with at least one lubricant selected from a predetermined group of lubricants consisting of:
polytetrafluorethylene (PTFE), graphite particles, petroleum distillates and grease.

22. The packing rubber of claim 18 wherein:
said base portion defines a first plane; and
said annular groove defines a second plane that is transverse to said first plane.

23. The packing rubber of claim 18 wherein:
said hole defines a third diameter; and
said fiber ring defines a fourth diameter that is less than said third diameter.

24. The packing rubber of claim 18 wherein:
said annular groove comprises a first planar surface; and
said annular groove comprises a second planar surface that is parallel to said first planar surface.

25. The packing rubber of claim 24 wherein:
said fiber ring comprises a first planar surface;
said fiber ring comprises a second planar surface;
said fiber ring first planar surface contacts said annular groove first planar surface; and
said fiber ring second planar surface contacts said annular groove second planar surface.

* * * * *